United States Patent
Rietman et al.

(10) Patent No.: US 10,027,409 B2
(45) Date of Patent: Jul. 17, 2018

(54) COMMUNICATION SYSTEM, LIGHTING SYSTEM AND METHOD OF TRANSMITTING INFORMATION

(71) Applicant: PHILIPS LIGHTING HOLDING B.V., Eindhoven (NL)

(72) Inventors: Ronald Rietman, Eindhoven (NL); Stephanus Joseph Johannes Nijssen, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 6 days.

(21) Appl. No.: 14/774,940

(22) PCT Filed: Mar. 3, 2014

(86) PCT No.: PCT/EP2014/054067
§ 371 (c)(1),
(2) Date: Sep. 11, 2015

(87) PCT Pub. No.: WO2014/139818
PCT Pub. Date: Sep. 18, 2014

(65) Prior Publication Data
US 2016/0028478 A1    Jan. 28, 2016

(30) Foreign Application Priority Data
Mar. 12, 2013   (EP) .................................. 13158807

(51) Int. Cl.
*H04B 10/00*       (2013.01)
*H04B 10/04*       (2006.01)
(Continued)

(52) U.S. Cl.
CPC ....... *H04B 10/116* (2013.01); *H04B 10/5563* (2013.01)

(58) Field of Classification Search
USPC ................................ 398/118, 182, 172, 187
See application file for complete search history.

(56) References Cited

U.S. PATENT DOCUMENTS 6,504,633 B1   1/2003   Hovorka et al.
7,016,115 B1   3/2006   Leeb et al.
(Continued)

FOREIGN PATENT DOCUMENTS

EP   2509398 A1   10/2012
JP   6032443 A    2/1985
(Continued)

*Primary Examiner* — David Payne
*Assistant Examiner* — Pranesh Barua
(74) *Attorney, Agent, or Firm* — Meenakshy Chakravorty

(57) ABSTRACT

The invention provides a communication system (500), a lighting system, a method of transmitting information and a computer program product. The communication system according to the invention is configured for transmitting data via visible light. The communication system comprises a signal generator (530) for generating a light driving signal (200) being a frequency shift key modulated signal comprising a sequence of signal parts (215, 225), each signal part being modulated at a first or second frequency in accordance with the data, the signal parts modulated at the first frequency having first pulses in first periods (T0) and the signal parts modulated at the second frequency having second pulses in second periods (T1). Energy of the visible light corresponding to a pulse in a respective period has center of gravity in time. The pulses in the periods are positioned so that the center of gravity is at the center of the period for reducing human-perceivable frequency components in the visible light driving signal.

13 Claims, 5 Drawing Sheets

(51) Int. Cl.
*H04B 10/12* (2006.01)
*H04B 10/116* (2013.01)
*H04B 10/556* (2013.01)

(56) References Cited

U.S. PATENT DOCUMENTS

| | | | | |
|---|---|---|---|---|
| 2002/0063935 A1* | 5/2002 | Price | ............... | H04B 10/505 398/182 |
| 2004/0218920 A1* | 11/2004 | Piotte | ............... | H04B 10/00 398/32 |
| 2006/0239689 A1* | 10/2006 | Ashdown | ............ | H04B 10/1141 398/130 |
| 2009/0257757 A1* | 10/2009 | Wan | ............... | H04B 10/504 398/202 |
| 2012/0002974 A1 | 1/2012 | Schenk et al. | | |
| 2012/0087676 A1 | 4/2012 | Lim et al. | | |
| 2012/0106978 A1* | 5/2012 | Jenson | ............... | H04B 13/02 398/182 |
| 2012/0127439 A1 | 5/2012 | Lin | | |
| 2012/0155889 A1 | 6/2012 | Kim et al. | | |
| 2012/0237224 A1* | 9/2012 | Etkin | ............... | H04L 12/40 398/99 |
| 2012/0269520 A1* | 10/2012 | Hong | ............... | H01L 25/167 398/172 |
| 2013/0070866 A1* | 3/2013 | Wu | ............... | H04L 27/36 375/260 |
| 2013/0202310 A1* | 8/2013 | Rietman | ............ | H04B 10/116 398/128 |
| 2013/0287403 A1* | 10/2013 | Roberts | ............ | H04B 10/1143 398/118 |
| 2014/0093234 A1* | 4/2014 | Roberts | ............ | H04J 14/00 398/25 |
| 2014/0093249 A1* | 4/2014 | Roberts | ............ | G01C 21/165 398/127 |
| 2014/0308048 A1* | 10/2014 | Roberts | ............ | H04L 27/10 398/187 |
| 2015/0003837 A1* | 1/2015 | Lee | ............... | H04N 9/3111 398/130 |
| 2015/0050018 A1* | 2/2015 | Hironishi | ............ | H04B 10/676 398/38 |
| 2015/0180585 A1* | 6/2015 | Sattler | ............ | H05B 33/0827 398/202 |
| 2015/0333860 A1* | 11/2015 | Rahn | ............... | H04L 27/0008 398/34 |

FOREIGN PATENT DOCUMENTS

| | | |
|---|---|---|
| JP | 2008187273 A | 8/2008 |
| JP | 2010041476 A | 2/2010 |
| WO | 2009040718 A2 | 4/2009 |

* cited by examiner

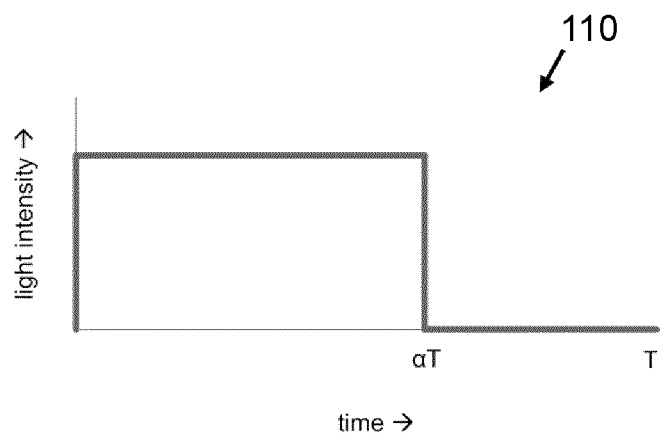
Prior Art Fig. 1a
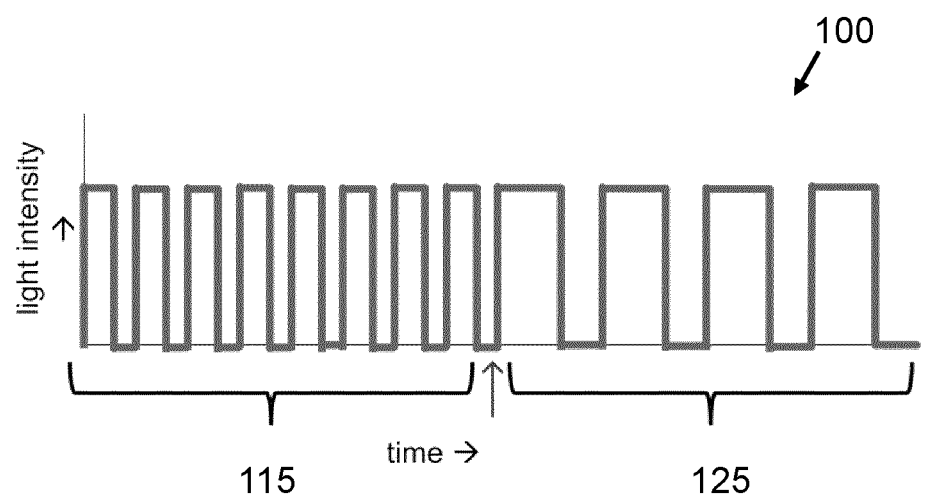
Prior Art Fig. 1b

COMMUNICATION SYSTEM, LIGHTING SYSTEM AND METHOD OF TRANSMITTING INFORMATION

CROSS-REFERENCE TO PRIOR APPLICATIONS

This application is the U.S. National Phase application under 35 U.S.C. § 371 of International Application No. PCT/EP2014/054067, filed on Mar. 3, 2014, which claims the benefit of European Patent Application No. 13158807.1, filed on Mar. 12, 2013. These applications are hereby incorporated by reference herein.

FIELD OF THE INVENTION

The invention relates to a communication system for transmitting data via visible light using frequency shift key modulated signals. The invention further relates to a lighting system, to a method of transferring information and to a computer program product.

BACKGROUND OF THE INVENTION

Transmission of information via light is a known technique. For ages we have been using infrared light to control devices such as televisions and audio/video systems in our house. However, as light sources emitting visible light are typically all around us, for example, in our houses and offices, ideas have evolved to transmit information using our ambient light sources. Especially challenging when using visible light is to enable data transmission without unwanted visible effects such as flicker, because the human eye is quite sensitive to intensity variations.

Since the introduction of solid state light sources in offices and houses this data transmission using the ambient light has re-emerged. Solid state light sources have several parameters that can be varied and controlled relatively easily. Such parameters include light intensity, light color, light color temperature and even light direction. For data transmission, relatively high switching frequency of the light source is important. So data may be embedded in light by modulating it. The simplest form of modulation is on-off switching at a certain frequency. This modulation is invisible for humans if this frequency is large enough, typically larger than 100 Hz. For most applications we may need to transmit more data than just the value of the embedded frequency. Different modulation methods may be used and one of these modulation method may be a technique known as frequency shift keying (further also indicated as frequency shift key) in which the frequency of the modulation is changed over time. However, early experiments showed that although the frequencies used in frequency shift key were well above 100 Hz, still visible flicker is perceived.

SUMMARY OF THE INVENTION

It is an object of the invention to provide a communication system using frequency shift key modulated signals in which un-wanted signal spikes or visible flicker is reduced.

A first aspect of the invention provides a communication system. A second aspect of the invention provides a lighting system. A third aspect of the invention provides a method of transferring information. A fourth aspect of the invention provides a computer program product. Advantageous embodiments are defined in the dependent claims.

The communication system according to the first aspect is configured for transmitting data via visible light using a frequency shift key modulated signal. The frequency shift key modulated signal comprises a sequence of signal parts, each signal part being modulated at a first or second frequency in accordance with the data, the signal parts modulated at the first frequency having first pulses in first periods and the signal parts modulated at the second frequency having second pulses in second periods, energy of the visible light corresponding to a pulse in a respective period having a center of gravity in time. The signal generator is configured for positioning the pulses in the periods so that the center of gravity is at the center of the period for reducing human-perceivable frequency components in the visible light.

When performing frequency shift key modulation the frequency shift key modulated signals include a concatenation of signal building blocks of different frequencies, named signal parts. Each signal part is modulated at a first or second frequency in accordance with the data, the signal parts modulated at the first frequency having first pulses in first periods and the signal parts modulated at the second frequency having second pulses in second periods. A pulse may also be named a basic waveform or building block for a signal. When pulses are concatenated to create a substantially infinite train of pulses, the frequency spectrum of such a signal is substantially a discrete frequency spectrum having peaks at the modulating frequency and multiples of that frequency. On the other hand, when only emitting a single pulse, the frequency spectrum of this signal pulse has a substantially continuous spectrum. The frequency shift key modulated signal is a concatenation of semi-infinite signal parts, and so it might be expected that the frequency spectrum of such a signal is substantially a discrete spectrum. However, considering the instantaneous changes from the first signal part having the first period to the second signal part having the second period, the inventors have seen that these instantaneous frequency jumps cause part of the continuous spectrum to re-appear so that it still will be present in the overall frequency spectrum of the frequency shift key modulated signals. This is because although the mean value of each pulse is the same, a term linear in frequency in the continuous spectrum is not the same for each pulse. When using a light source to transmit these frequency shift key modulated signals, a low-frequency part of the continuous spectrum present in the frequency shift key modulated signal causes the visible flicker. The inventors have found that human-perceivable frequency components in the visible light are strongly reduced when the pulses in the periods are so positioned that the center of gravity is at the center of the period.

Optionally, in the frequency shift key modulated signal according to the invention, the time period between a center of gravity of the last one of the first pulses of the first signal part and a center of gravity of the first one of the second pulses of the following second signal part is substantially equal to half of the sum of the first period and the second period. The inventors have found that human-perceivable frequency components in the visible light driving signal are strongly reduced when the frequency shift key modulated signal is constructed such that the time period as defined above is between the first pulse and the second pulse. The inventors believe that the substantially constant time period between the first pulse and the second pulse cause the low frequency part to be strongly reduced. In known pulses for frequency shift key modulated signals, the pulse is typically located at the beginning of the period of the pulse (see also FIG. 1a). When generating a sequence of the first signal part and the second signal part, the time period between the known pulses will be different when changing from the first signal part to the second signal part compared to changing from the second signal part to the first signal part. These differences in the time period are relatively low frequency changes which cause this visible flicker when transmitting these known frequency shift key modulated signals using visible light.

In mathematics, a center of gravity is a point in a body around which the resultant torque due to gravity forces vanishes. Equivalently, a center of gravity of the energy of the visible light corresponding to the pulse in a period is defined as a point in time around which the pulse is substantially symmetric, or said differently:

$$\int_0^{T_g}(T_E-t)I(t)dt = \int_{T_g}^{T}(t-T_E)I(t)dt$$

where $I(t)$ is the intensity at time t of the pulse, T is the period of the pulse and $T_g$ is the center of gravity of the pulse. When the time period between the center of gravity of the last one of the first pulses of the first signal part and the first one of the second pulses of the second signal part is substantially equal to half of the sum of the first period and the second period, the low-frequency content of the pulses, i.e. the term linear in frequency which is proportional to $1/F$, does not appear in the spectrum of the infinite block sequence if each block has the same duration. As a result, visible flicker is strongly reduced. In an embodiment of the communication system according to the invention, the time period is equal to half of the sum of the first period and the second period. Next to the duration of the time period, also other characteristics of the frequency shift key modulated signal may determine the visibility of flicker in the emitted visible light signal, such as a duration of the first period and second period—and so some deviation of the time period as defined above may be allowable without departing from the scope of the invention. Experiments have shown that a deviation of about 5% of the time period will not lead to visible flicker. Mathematical analysis has shown that when using relatively high frequencies the signal peaks and visible flicker is further reduced.

In an embodiment of the communication system according to the invention, the signal generator is configured for inserting a further signal between the last one of the first pulses and the first one of the second pulses for obtaining the time period. Alternatively, the signal generator may be configured for reducing the first period from the last one of the first pulses and/or for reducing the second period from the first one of the second pulses for obtaining the time period.

In an embodiment of the communication system, the first pulse is configured for having the center of gravity at a center of the first period, and the second pulse is configured for having the center of gravity of the second pulse at a center of the second period. In such an embodiment in which the center of gravity of the pulses is substantially at the center of the period of the pulse, the time period between the center of gravity of the first pulse and the center of gravity of an adjacent second pulse automatically complies with the definition: half of the sum of the first period and the second period. As indicated before, this will strongly reduce the visible flicker when transmitting the frequency key shift modulated signal using a light source. To generate the first pulse to have the center of gravity at the center of its first period, the first pulse may be phase-shifted within the first period. To generate the second pulse to have the center of gravity at the center of the second period, the second pulse may also be phase-shifted within the second period.

Examples of pulses having the center of gravity around the center of the period are, for example, waveforms that are symmetric with respect to the center of the period—however, also non-symmetric waveforms may be chosen that have the center of gravity substantially at the center of the period. Some further examples are provided in the description.

In an embodiment of the communication system, the first pulses are symmetric with respect to the center of the first period, and/or the second pulse is symmetric with respect to the center of the second period. As indicated before, a pulse which is symmetric about the center of the period are intuitively the easiest waveforms that have a center of gravity at the center of the period of the waveform. In the communication system connected to a light source for emitting the frequency shift key modulated signal, such symmetric waveforms may, for example, be pulse-width-modulated waveforms (further also indicated as PWM waveforms) for driving the light source. Such pulse-width-modulated waveforms are often also used for controlling an intensity of the overall perceived light emitted by the light source. By tuning the width of the pulse in the pulse-width-modulated waveform the perceived intensity may be adapted. Shifting the pulse-width-modulated waveform having the required width such that it is arranged symmetric about the center of the period may create, for example, the first pulse. Shrinking or expanding the period of this first pulse may create the second pulse which both may be used to modulate data in the frequency shift key modulated data transfer. Due to the fact that the average pulse width with respect to the period of the pulses of both the first pulse and the second pulse are equal, the same light intensity is perceived although both the first signal part and the second signal part have a different frequency. Due to the symmetry, the center of gravity of both the first pulse and the second pulse are substantially at the center of the respective periods, strongly reducing any unwanted peaks (or visible flicker) in the emitted frequency spectrum.

And so optionally, the first pulses and the second pulses comprise a block-pulse. The center of gravity of the first pulse may, for example, be substantially at the center of the first period. Alternatively or additionally, the center of gravity of the second pulse may, for example, to be substantially at the center of the second period.

In an embodiment of the communication system according to the invention, an intensity of the visible light is determined by a width of the block-pulse in the first pulses in relation to the first period, and a width of the block-pulse in the second pulses in relation to the second period. As indicated before, such light driving signal is also known as a Pulse-Width-Modulated signal.

In an embodiment of the communication system, the first signal part comprises a concatenation of an integer number of first pulses, and/or wherein the second signal part comprises a concatenation of an integer number of second pulses. A benefit of such frequency shift key modulated signal is that the sequence of the first signal part and the second signal part is an orderly sequence of first pulses and second pulses which further reduces any unwanted additional frequency components to occur in the overall transmitted frequency shift key modulated signal.

In an embodiment of the communication system, the communication system is connected to a light emitter for emitting the frequency shift key modulated signal. This enables the communication system to send the frequency shift key modulated signal using, for example, ambient light units in houses or offices.

The lighting system according to the second aspect comprises the communication system according to the invention.

Optionally, the lighting system comprises the light emitter is selected from a list comprising: a LED, an OLED, a LASER, a high pressure discharge lamp, and a fluorescent lamp.

The method according to the third aspect is configured for embedding data in visible light. The method comprising the steps of:

generating a light driving signal being a frequency shift key modulated signal comprising a sequence of first signal parts and second signal parts in accordance with the data, each first signal part comprising at least one first pulse having a first period and each second signal part comprising at least one second pulse having a second period different from the first period, the light driving signal comprising a time period between a center of gravity of the last one of the first pulses of the first signal part and a center of gravity of the first one of the second pulses of the following second signal part being substantially equal to half of the sum of the first period and the second period for reducing human-perceivable frequency components in the visible light driving signal, and providing the light driving signal to a source of visible light.

In an embodiment of the method, the time period is obtained by inserting a further signal between the last one of the first pulses and the first one of the second pulses, or wherein the time period is obtained by reducing the first period from the last one of the first pulses and/or by reducing the second period from the first one of the second pulses.

In an embodiment of the method, the first pulse is configured for having the center of gravity of the first pulse at a center of the first period, and/or the second pulse is configured for having the center of gravity of the second pulse in a center of the second period.

In an embodiment of the method according to the invention, the method is configured for generating the first pulse and the second pulse having a block-pulse.

The computer program product according to the fourth aspect is configured for transmitting data via visible light, which program is operative to cause a processor to perform the method according to the invention.

These and other aspects of the invention are apparent from and will be elucidated with reference to the embodiments described hereinafter.

It will be appreciated by those skilled in the art that two or more of the above-mentioned options, implementations, and/or aspects of the invention may be combined in any way deemed useful.

Modifications and variations of the color conversion arrangement, the lighting unit and the solid state light emitter package, which correspond to the described modifications and variations of the color conversion arrangement, can be carried out by a person skilled in the art on the basis of the present description.

BRIEF DESCRIPTION OF THE DRAWINGS

In the drawings:

FIG. 1a shows a first pulse or a second pulse according to the prior art, and FIG. 1b shows a known frequency shift key modulated signal.

Figure 2A:
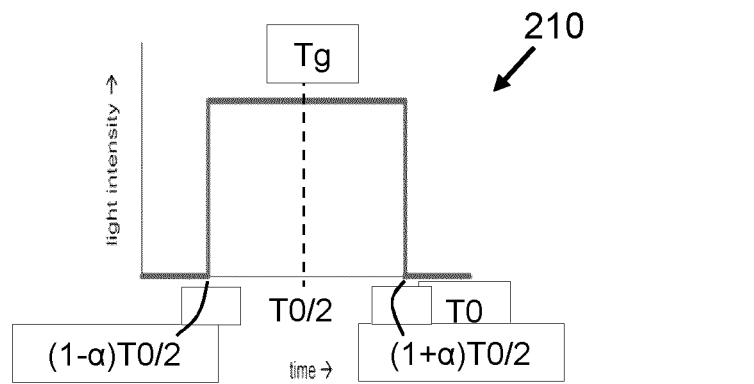
FIGS. 2a and 2b show a first pulse and a second pulse, respectively, according to the invention.

It should be noted that items denoted by the same reference numerals in different Figures have the same structural features and the same functions, or are the same signals. Where the function and/or structure of such an item have been explained, there is no necessity for repeated explanation thereof in the detailed description.

The Figures are purely diagrammatic and not drawn to scale. Particularly for clarity, some dimensions are exaggerated strongly.

DETAILED DESCRIPTION

FIG. 1a shows a first pulse 110 or a second pulse 110 according to the prior art. This first pulse 110 or second pulse 110 comprises of a block-pulse having a width of $\alpha T$ and a frequency equal to $1/T$. Such pulse may, for example, be used in known frequency shift key modulated signal 100 as shown in FIG. 1b. When such pulse 110 is used for frequency shift key modulated signals 100 which is transmitted using visible light, the width $\alpha T$ of the block-pulse is used to define a perceived intensity of the overall emitted light. This perceived intensity may be adapted by adapting the width $\alpha T$ of this pulse 110, which is also known as Pulse Width Modulation of the signal to adapt the perceived intensity of the light emitter 530 (see FIG. 5). To generate a frequency shift key modulated signal 100, the pulse 110 as shown in FIG. 1a may be used at two different frequencies and information may be coded using a predefined sequence of the pulse 110 at different frequencies. The inventors have found that when using such pulse 110 to generate the know frequency shift key modulated signal 100, visible flicker is perceived.

Figure 2B:
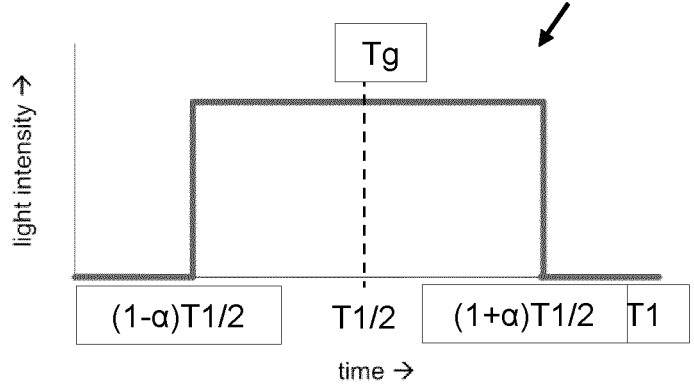

FIGS. 2a and 2b show a first pulse 210 and a second pulse 220, respectively, according to the invention. The first pulse 210 again comprises a substantial block-wave (similar to what is already shown in FIG. 1a). However, this block-wave is shifted within the first period T0 along a time axis such that the block-wave is arranged substantially symmetric about the center T0/2 of the first period T0. Also the second pulse 220 shown in FIG. 2b is shifted within the second period T1 along the time axis such that the block-wave again is arranged substantially symmetric about the center T1/2 of the second period T1. Due to the fact that the width of the block-wave in both the first pulse 210 and the second pulse 220 remains equal to $\alpha T$, the perceived intensity of the light remains the same for all of the block-wave forms shown in FIGS. 1a, 2a and 2b. However, when using the frequency shift key modulated signal 200 constituted of the first pulse 210 and the second pulse 220 transmitted using a light emitter 530, the visible glitches are strongly reduced or even completely eliminated.

Figure 2C:
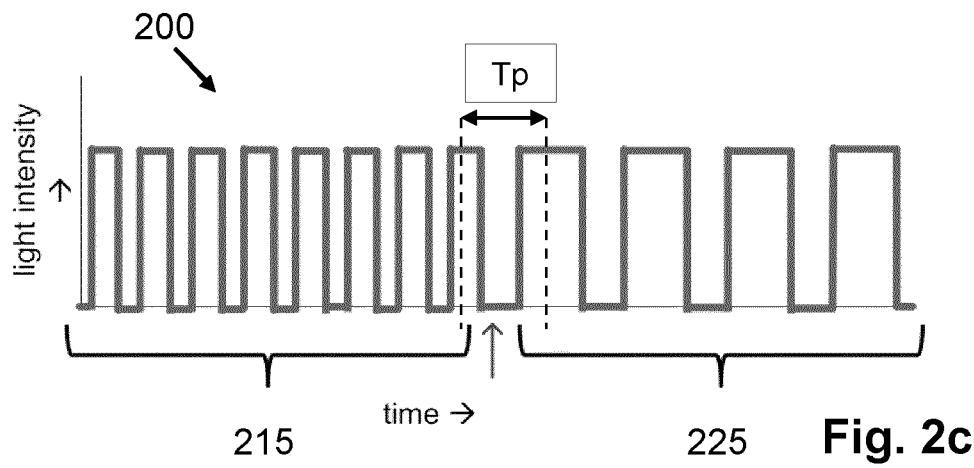
FIG. 2c shows a frequency shift key modulated signal according to the invention constituted of a first signal part of the first pulses and a second signal part of the second pulses.

FIG. 2c shows a frequency shift key modulated signal according to the invention constituted of a first signal part of the first pulses and a second signal part of the second pulses. When performing frequency shift key modulation the frequency shift key modulated signals 100, 200 include a concatenation of pulses 110, 210, 220 of different frequencies, indicated as the first signal part 115, 215 and the second signal part 125, 225. The frequency shift key modulated signal 100 is a substantially infinite concatenation of pulses 110, and so it might be expected that the frequency spectrum of such a signal is substantially a discrete spectrum. However, due to the instantaneous changes from the first signal part 115 having the first frequency f0 (or first period T0) to the second signal part 125 having the second frequency f1 (or second period T1) the inventors believe that these instantaneous frequency jumps cause part of the continuous spectrum to re-appear. When using a light emitter 530 (see FIG. 5) to transmit these frequency shift key modulated signals 100, a low-frequency part of the continuous spectrum present in the frequency shift key modulated signal causes visible flicker during transmission of the frequency shift key modulated signals 100.

In the frequency shift key modulated signal 200 according to the invention, the first pulse 210 constituting the first signal part 215 has been configured such that a center of gravity of the first pulse is at a center T0/2 of the first period T0. This is achieved by shifting the block-wave along the time axis as shown in FIG. 2a. Also the second pulse 220 constituting the second signal part 225 has been configured such that a center of gravity of the second pulse is at a center T1/2 of the second period T1. Again, this is achieved by shifting the block-wave along the time axis as shown in FIG. 2b. By shifting the block-wave such that the center of gravity is at the center of the period, time period Tp between the first signal part 215 and the second signal part 225 is the same value which causes a strong reduction of visible flicker.

In an alternative embodiment (not explicitly shown), the first pulse and the second pulse have a shape similar to the prior art pulse 110 shown in FIG. 1a, and the time period Tp is obtained by including a further signal between the pulses. This further signal may, for example, expand the "zero" intensity duration of the first pulse, or may, for example, reduce the "zero" intensity duration of the second pulse.

Figure 3A:
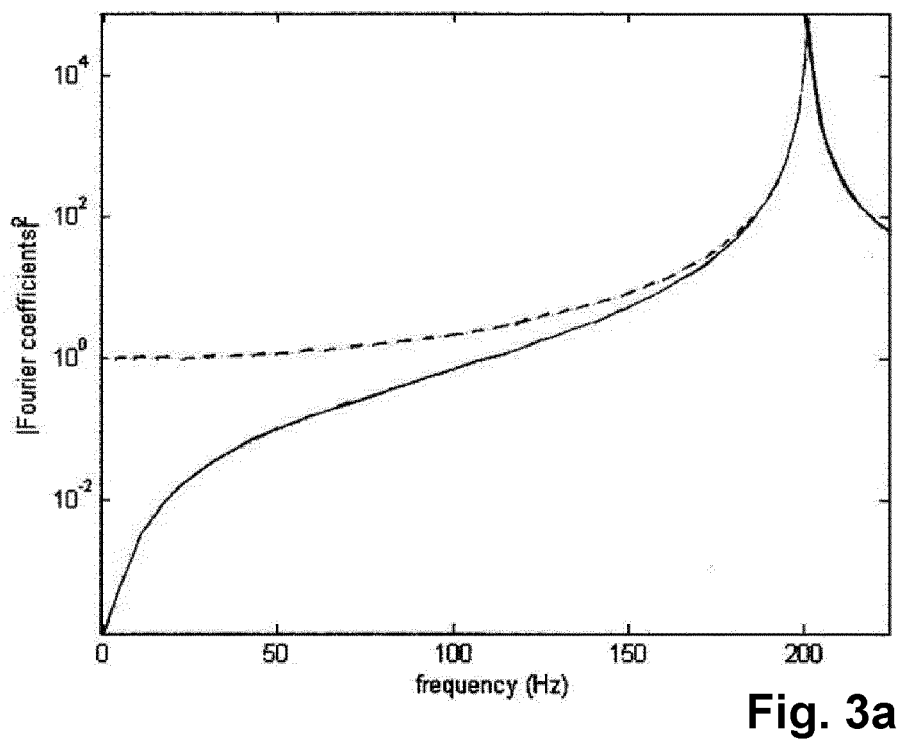
FIG. 3 shows a low-frequency spectrum of the prior art frequency shift key modulated signal and of the frequency shift key modulated signal according to the invention, FIGS. 4a to 4k schematically show different first pulses or second pulses of which some of the schematically shown waveforms have a center of gravity at the center of the period, FIG. 5 schematically shows an embodiment of a communication system according to the invention, connected to a light emitter.

FIG. 3a shows a low-frequency spectrum of the prior art frequency shift key modulated signal 100 (dashed line) and of the frequency shift key modulated signal 200 according to the invention (solid line). In this spectrum of FIG. 3a, the frequency shift key modulated signals 100, 200 having a period of 1 second, a duty cycle of 50%, consisting of 100 waveforms of a duration of 5 milliseconds, followed by 200 waveforms of a duration of 2.5 milliseconds. The frequency shift key modulated signals 200 (solid line) having the first pulse 210 (shown in FIG. 2a) and the second pulse 220 (shown in FIG. 2b) according to the invention have much less energy at low frequency compared to the know frequency shift key modulated signal 100 (dashed line) having the known pulse 110 (shown in FIG. 1a).

In the below mathematical analysis it is shown that when shifting the center of gravity to the center of the period of the pulse 210, 220, the visible flicker is indeed significantly reduced.

Considering signals that are concatenations of simple on-off blocks with duty cycle $\alpha$, the block is defined in terms of a two-parameter function $b_{\epsilon,\alpha}$ with support in [0, 1) and parameters $\alpha$ and $\epsilon$ satisfying $0 \leq \alpha \leq 1$ and $0 \leq \epsilon \leq (1-\alpha)$:

$$b_{\epsilon,\alpha}(x) = \begin{cases} 1 & \text{if } x \in [\epsilon, \epsilon + \alpha), \\ 0 & \text{otherwise} \end{cases}. \tag{1}$$

A signal x(t) with modulation frequency $f_0$ can now be constructed as $$\sum_{n=-\infty}^{\infty} b(f_0 t - n).$$

To calculate the Fourier transform of this signal:

$$\begin{aligned} X(f) &= \int_{-\infty}^{\infty} x(t) e^{-2\pi i f t} \, dt \\ &= \int_{-\infty}^{\infty} \sum_{n=-\infty}^{\infty} b_{\epsilon,\alpha}(f_0 t - n) e^{-2\pi i f t} \, dt \\ &= \sum_{n=-\infty}^{\infty} \int_{-\infty}^{\infty} b_{\epsilon,\alpha}(f_0 t) e^{-2\pi i f(t+n/f_0)} \, dt \\ &= \sum_{n=-\infty}^{\infty} e^{-2\pi i n f / f_0} \int_{\epsilon/f_0}^{(\epsilon+\alpha)/f_0} e^{-2\pi i f t} \, dt \\ &= \sum_{m=-\infty}^{\infty} \delta(f/f_0 - m) e^{-2\pi i (f/f_0)(\epsilon+\alpha/2)} \frac{\sin(\alpha \pi f / f_0)}{\pi f} \\ &= \sum_{m=-\infty}^{\infty} \delta(f - m f_0) e^{-2\pi i (f/f_0)(\epsilon+\alpha/2)} \frac{\sin(\alpha \pi f / f_0)}{\pi f / f_0}. \end{aligned} \tag{2}$$

The signal x(t) is periodic with period $1/f_0$, so the Fourier transform consists of a series of delta peaks at integer multiples of $f_0$, and the signal can also be written as a Fourier series:

$$\begin{aligned} x(t) &= \int_{-\infty}^{\infty} X(f) e^{2\pi i f t} \, df \\ &= \sum_{m=-\infty}^{\infty} e^{2\pi i m f_0 t} e^{-2\pi i m(\epsilon+\alpha/2)} \frac{\sin(\alpha \pi m)}{\pi m}, \end{aligned} \tag{3}$$

Note that X(f) is strictly zero for all non-zero frequencies f with $|f| < f_0$. If the signal x(t) represents the strength of visible light, this explains why the presence of the modulation is imperceptible if $f_0$ is greater than 100 Hz.

Now let's consider a signal y(t) in which the modulation frequency is $f_0$ for t<0 and $f_1$ for t>0:

$$y(t) = \sum_{n=-\infty}^{-1} b_{\epsilon,\alpha}(f_0 t - n) + \sum_{n=0}^{\infty} b_{\epsilon,\alpha}(f_1 t - n). \tag{4}$$

Again if the Fourier transform is calculated:

$$Y(f) = \sum_{n=-\infty}^{-1} e^{-2\pi i n(f/f_0)} e^{-2\pi i(f/f_0)(\epsilon+\alpha/2)} \frac{\sin(\alpha \pi f / f_0)}{\pi f} + \qquad (5)$$

$$\sum_{n=0}^{\infty} e^{-2\pi i n(f/f_1)} e^{-2\pi i(f/f_1)(\epsilon+\alpha/2)} \frac{\sin(\alpha \pi f / f_1)}{\pi f}$$

$$= \frac{1}{2}\left[\sum_{m=-\infty}^{\infty} \delta(f/f_0 - m) - 1 + i\cot(\pi f / f_0)\right]$$

$$e^{-2\pi i(f/f_0)(\epsilon+\alpha/2)} \frac{\sin(\alpha \pi f / f_0)}{\pi f} +$$

$$\frac{1}{2}\left[\sum_{m=-\infty}^{\infty} \delta(f/f_1 - m) + 1 - i\cot(\pi f / f_1)\right]$$

$$e^{-2\pi i(f/f_1)(\epsilon+\alpha/2)} \frac{\sin(\alpha \pi f / f_1)}{\pi f}$$

$$= \frac{1}{2}\sum_{m=-\infty}^{\infty} \delta(f - mf_0) e^{-2\pi i(f/f_0)(\epsilon+\alpha/2)} \frac{\sin(\alpha \pi f / f_0)}{\pi f / f_0} +$$

$$\frac{1}{2}\sum_{m=-\infty}^{\infty} \delta(f - mf_1) e^{-2\pi i(f/f_1)(\epsilon+\alpha/2)} \frac{\sin(\alpha \pi f / f_1)}{\pi f / f_1} +$$

$$\frac{i}{2\pi f}\left[e^{i\pi(f/f_0)(1-2\epsilon-\alpha)} \frac{\sin(\alpha \pi f / f_0)}{\sin(\pi f / f_0)} - e^{i\pi(f/f_1)(1-2\epsilon-\alpha)} \frac{\sin(\alpha \pi f / f_1)}{\sin(\pi f / f_1)}\right]$$

From this, one can see that the spectrum of y(t) contains a discrete part, at integer multiples of $f_0$ and $f_1$, and a continuous part. Looking at the low-frequency behavior of the continuous part:

$$Y_{cont}(f) = \frac{i}{2\pi f}\left[e^{i\pi(f/f_0)(1-2\epsilon-\alpha)} \frac{\sin(\alpha \pi f / f_0)}{\sin(\pi f / f_0)} - e^{i\pi(f/f_1)(1-2\epsilon-\alpha)} \frac{\sin(\alpha \pi f / f_1)}{\sin(\pi f / f_1)}\right] \qquad (6)$$

$$= -\frac{1}{2}\alpha(1 - 2\epsilon - \alpha)\left(\frac{1}{f_0} - \frac{1}{f_1}\right) +$$

$$i\pi f \alpha\left(\frac{1}{12}(1-\alpha^2) - \frac{1}{4}(1-2\epsilon-)^2\right)\left(\frac{1}{f_0^2} - \frac{1}{f_1^2}\right) + O(f^2)$$

The constant term can be made to vanish by choosing $\epsilon=(1-\alpha)/2$. This greatly reduces the low frequency content of y(t), and hence will reduce the perceptibility of the modulation frequency change.

The human eye may in this context be modeled as a low-pass filter with frequency response H(f). Since the modulation frequencies must be chosen such that $|H(f_0)|$ and $|H(f_1)|\ll 1$, only the delta peak at f=0 and the low frequency part of the continuous spectrum contribute to the filtered signal:

$$(h*y)(t) = \int_{-\infty}^{\infty} H(f)Y(f)e^{2\pi i f t}\,df \qquad (7)$$

$$\approx \alpha - \frac{1}{2}\alpha(1-2\epsilon-\alpha)\left(\frac{1}{f_0} - \frac{1}{f_1}\right)h(t) +$$

$$\alpha\left(\frac{1}{24}(1-\alpha^2) - \frac{1}{8}(1-2\epsilon-\alpha)^2\right)\left(\frac{1}{f_0^2} - \frac{1}{f_1^2}\right)h'(t).$$

As an example, assume a filter of order k+1, with frequency response:

$$H(f) = \left(\frac{1}{1 + 2\pi i f \tau}\right)^{k+1}, \qquad (8)$$

where $\tau$ is in the order of 0.015 s and k=4. The impulse response of this filter is:

$$h(t) = \int_{-\infty}^{\infty} H(f)e^{2\pi i f t}\,df = \begin{cases} \frac{1}{k!\tau}\left(\frac{t}{\tau}\right)^k e^{-t/\tau} & \text{if } t > 0, \\ 0 & \text{otherwise} \end{cases} \qquad (9)$$

Figure 3B:
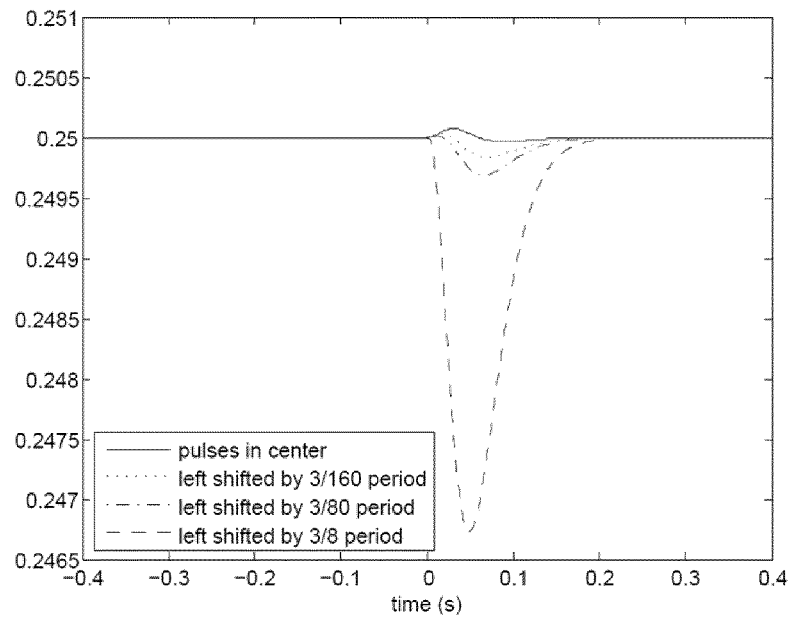

The frequency shift key modulated signal 200 is plotted in FIG. 3b as a function of time for $\alpha=0.25$, $f_0=200$ Hz, $f_1=400$ Hz for four cases: $\epsilon=0$ (dashed curve—pulse similar to FIG. 1a), $\epsilon=0.3375$ (dash-dot curve), $\epsilon=0.3563$ (dotted curve) and finally, $\epsilon=(1-\alpha)/2=0.375$ (solid curve—pulse similar to FIGS. 2a and 2b) in which the block-pulse is arranged at the center of the period. The visible flicker for the dashed peak is more than 1% of the light intensity and thus clearly visible, while the curve indicating the frequency shift key modulated signal 200 according to the invention shows only a minor intensity variation which is not visible for the human eye. In addition, the dotted curve shows that a shift of about 5% of the block-pulse will also not lead to visible flicker—clearly showing that some deviation in the time period Tp may be allowed without departing from the scope of the invention.

Figure 4A:
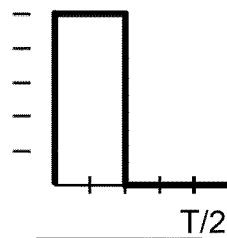
Figure 4B:
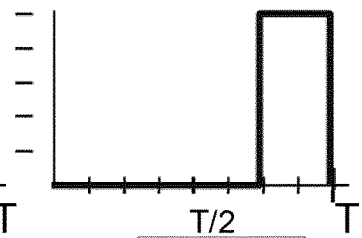
Figure 4C:
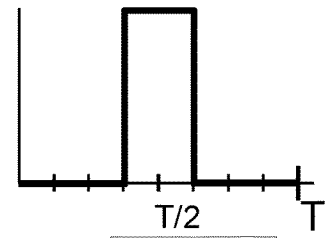
Figure 4D:
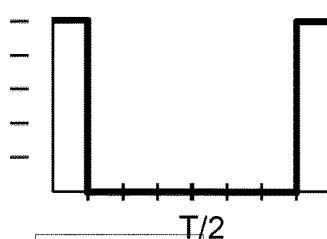
Figure 4E:
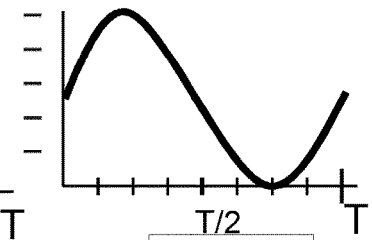
Figure 4F:
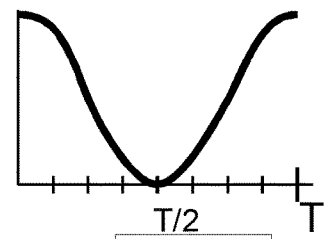
Figure 4G:
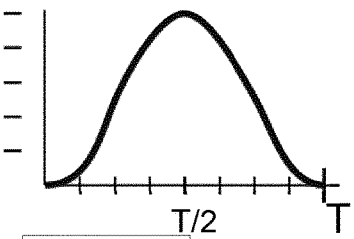
Figure 4H:
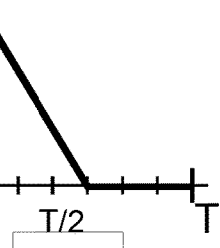
Figure 4I:
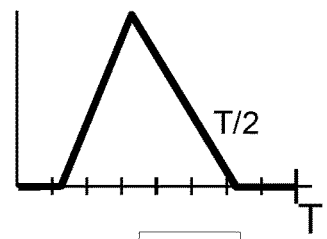
Figure 4J:
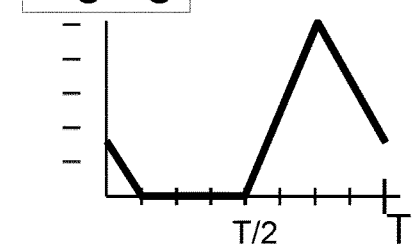
Figure 4K:
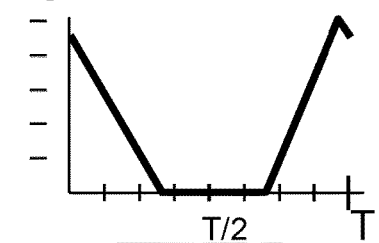

FIGS. 4a to 4k schematically show different first pulses 210 or second pulses 220 of which some of the schematically shown waveforms have a center of gravity at the center of the period. As indicated before symmetric waveforms around the center of the period T0/2, T1/2 may be used to reduce the visible flicker. However, also non-symmetric waveforms may be chosen that have the center of gravity at the center T0/2, T1/2 of the period T0, T1. In the embodiments of pulses 210, 220 shown in FIGS. 4a to 4k the period is indicated with "T" and may represent the first period T0 or the second period T1, and the center of the period is indicated with "T/2" and may represent the center T0/2 of the first period T0 or the center T1/2 of the second period T1. FIGS. 4a and 4b clearly are not symmetric about the center T of the period T/2 and clearly do not have a center of gravity at the center of the period. As such, when using the pulses shown in FIGS. 4a and 4b for transmitting information using visible light, visible flicker may be expected. On the other hand, the pulses shown in FIGS. 4c and 4d are symmetric about the center T/2 of the period T, and so when using these pulses of FIGS. 4c and 4c, a strong reduction of the visible flicker may be expected. The pulse shown in FIG. 4e again is not symmetric about the center T/2 and so when using this pulse again visible glitches can be expected. However, the pulse shown in FIGS. 4f and 4g again are symmetric about the center T/2 of the period T and so again, when using these pulses to transmit frequency shift key modulated signals 200 using a light emitter, a strong reduction of visible flicker may be expected, or no visible flicker will be present at all. For similar reasons will frequency shift key modulated signals 100 comprising the pulses shown in FIGS. 4h and 4j comprise visible flicker, while the center of gravity of the pulses shown in FIGS. 4i and 4k may be close enough to the center of the period to show very low or no visible flicker when transmitting information using visible light.

Figure 5:
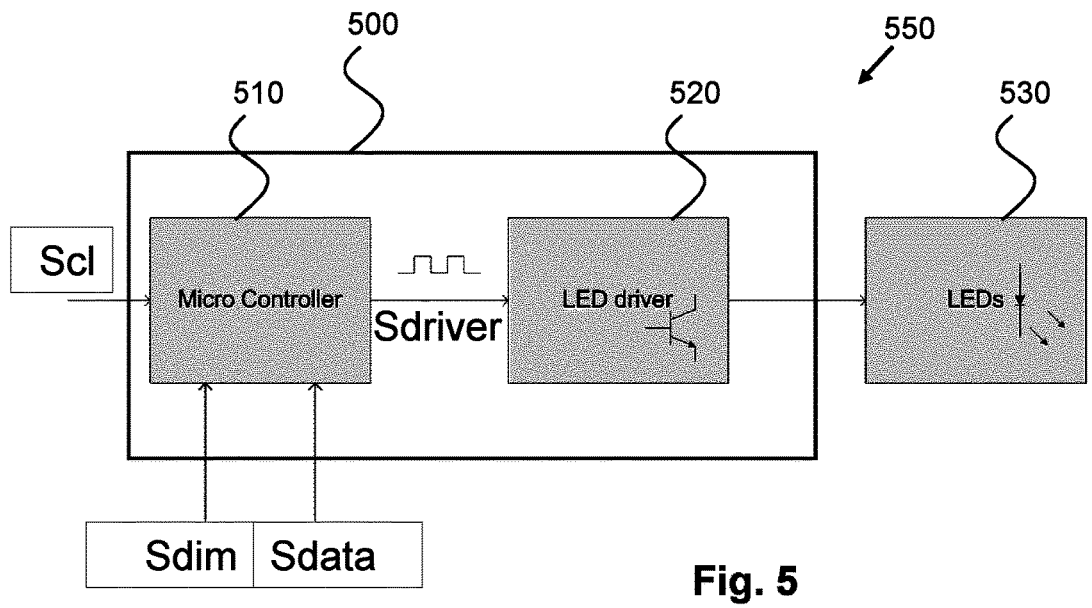

FIG. 5 schematically shows an embodiment of a communication system 500 according to the invention, connected to a light emitter 530. The communication system 500 may, for example, comprise a microcontroller 510 which receives a clock signal Scl, a light dimming signal Sdim and a data signal Sdata and provides a driver signal Sdriver to driver electronics 520 for driving the light source 530. So the microcontroller 510 is the signal generator 510 of this communication system 500. The dimming signal Sd may be used to define the width of the pulse (previously indicted with the factor α). In this embodiment, the driver electronics 520, for example, comprises electronics for driving a LED light emitter 530, but the drive electronics 520 may be configured for driving any light emitter suitable for transmitting light via a frequency shift key modulated optical signal. The light emitter 530, for example, comprises a Light Emitting Diode, but may comprise any light source suitable for transmitting the frequency shift key modulated optical signal.

Figure 6:
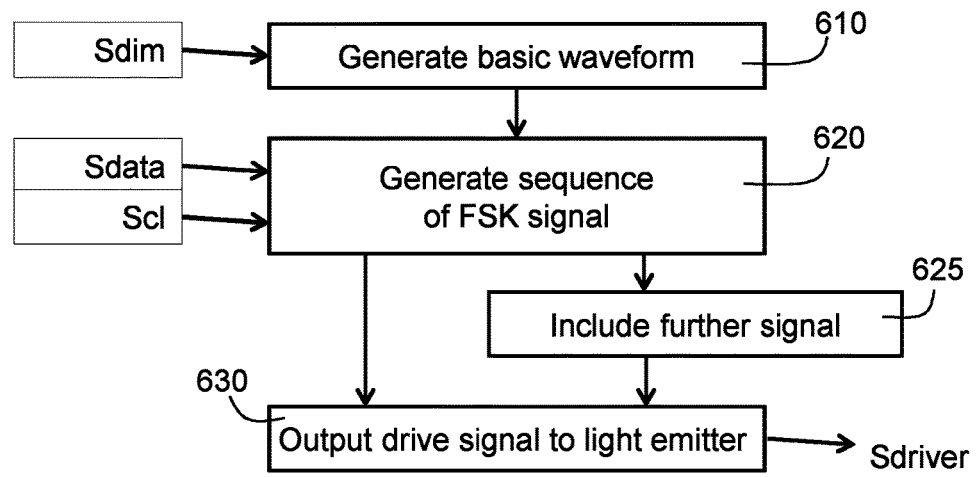
FIG. 6 shows a flow diagram of the signal generator of the communication system according to the invention.

FIG. 6 shows a flow diagram of the signal generator 510 of the communication system 500. The signal generator 510 or microcontroller 510 receives in step 610 the dimming signal Sdim such that the pulse may be generated which, when included in an FSK signal, will provide the correct intensity of the light emitter 530. Subsequently, in step 620 the signal generator 510 receives the data signal Sdata and the clock signal Scl to generate the Frequency Shift Key modulated signal representing the data. When the pulse is similar to the prior art pulse (see FIG. 1a), the signal generator 510 may include the further signal in step 625 to ensure that the time period Tp between the last pulse of the first signal part and the first pulse of the second signal part are spaced according to the invention. Alternatively, when the pulse is similar to the first pulse 210 (FIG. 2a) and the second pulse 220 (FIG. 2b), the step 625 of including the further signal may be omitted to still obtain the correct time period Tp according to the invention. Finally, in step 630 the signal generator 510 provides the FSK modulated drive signal Sdrive to the light emitter 530 for emitting the data via the light emitter 530 while generating the required light intensity without visible flicker.

Summarized, the current invention provides a communication system, a lighting system, a method of transmitting information and a computer program product. The communication system according to the invention is configured for transmitting data via visible light. The communication system comprises a signal generator for generating a light driving signal being a frequency shift key modulated signal comprising a sequence of first signal parts and second signal parts in accordance with the data. Each first signal part comprises at least one first pulse having a first period and each second signal part comprises at least one second pulse having a second frequency, different from the first frequency. A time period between a center of gravity of the last one of the first pulses of the first signal part and a center of gravity of the first one of the second pulses of the following second signal part being substantially equal to half of the sum of the first period and the second period for reducing human-perceivable frequency components in the visible light driving signal.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A communication system for transmitting data via visible light using a Light Emitting Diode (LED) source for illuminating a space, the communication system comprising:
   a signal generator configured to generate a light driving signal being a frequency shift key modulated signal comprising a sequence of signal parts,
   each signal part being modulated at a first or second frequency in accordance with the data, the signal parts modulated at the first frequency having first periods and the signal parts modulated at the second frequency having second periods, each of the first periods having a respective first pulse and each of the second periods having a respective second pulse, each first pulse having a first center of gravity and each second pulse having a second center of gravity;

wherein the signal generator is configured to reduce human-perceivable frequency components in the visible light produced by the LED source by positioning the first center of gravity of each first pulse respectively at the center of each first period and the second center of gravity of each second pulse respectively at the center of each second period, such that the energy of the visible light corresponding to each first and second pulse is respectively symmetric in time around the center of each first and second period, wherein the sequence of signal parts includes a first signal part that is followed by a second signal part, and a time period between the first center of gravity of a last one of the first pulses in the first signal part and the second center of gravity of a first one of the second pulses in the second signal part equals half of the sum of the first period and the second period.

2. The communication system of claim 1, wherein each of the first pulses is symmetric with respect to the center of the respective first period, and/or wherein each of the second pulses is symmetric with respect to the center of the respective second period.

3. The communication system of claim 1, wherein the first pulses and the second pulses comprise a block-pulse.

4. The communication system of claim 3, wherein an intensity of the visible light is determined by a width of the block-pulse in the first pulses in relation to the first period, and a width of the block-pulse in the second pulses in relation to the second period.

5. The communication system according to claim 1, wherein the first signal part comprises a concatenation of an integer number of first periods, and/or wherein the second signal part comprises a concatenation of an integer number of second periods.

6. The communication system according to claim 1, wherein the communication system is connected to a light driver electronics for providing the light driving signal to the light source for transmitting the data.

7. A lighting system comprising the communication system according to claim 1.

8. The communication system of claim 1, wherein the signal generator is configured for inserting a further signal between a last one of the first periods (T0) and a first one of the second periods (T1) for obtaining said time period (Tp), or wherein the signal generator is configured to reduce the last one of the first periods (T0) and/or to reduce the first one of the second periods (T1) for obtaining said time period (Tp).

9. A method of embedding data in visible light using a Light Emitting Diode (LED) source for illuminating a space, the method comprising:

generating a light driving signal being a frequency shift key modulated signal comprising a sequence of signal parts, modulating each signal part at a first or second frequency in accordance with the data, the signal parts modulated at the first frequency having first periods and the signal parts modulated at the second frequency having second periods, each of the first periods having a respective first pulse and each of the second periods having a respective second pulse, positioning a center of gravity of each pulse at the center of the respective period such that the energy of the visible light corresponding to the pulse is symmetric in time around the center of the respective period, thereby reducing human-perceivable frequency components in the visible light, and providing the light driving signal to the LED source of visible light configured to illuminate the space;

wherein the sequence of signal parts including a first signal part that is followed by a second signal part, and generating of the light driving signal is configured such that a time period between the first center of gravity of a last one of the first pulses in the first signal part and the second center of gravity of a first one of the second pulses in the second signal part equals half of the sum of the first period and the second period.

10. The method according to claim 9, wherein the first pulse and the second pulse comprise a block-pulse.

11. Computer program product for transmitting data via visible light, which program is operative to cause a processor to perform the method as claimed in claim 9.

12. The method according to claim 9, wherein said time period (Tp) is obtained by inserting a further signal between a last one of the first periods (T0) and a first one of the second periods (T1), or wherein said time period (Tp) is obtained by reducing the last one of the first periods (T0) and/or by reducing the first one of the second periods (T1).

13. A lighting system comprising:

a Light Emitting Diode (LED) source configured to illuminate a space, a communication system configured to transmit data via visible light by the LED source, a signal generator configured to generate a light driving signal being a frequency shift key modulated signal comprising a sequence of signal parts, each signal part being modulated at a first or second frequency in accordance with the data, the signal parts modulated at the first frequency having first periods and the signal parts modulated at the second frequency having second periods, each of the first periods having a respective first pulse and each of the second periods having a respective second pulse, wherein the signal generator is configured to reduce human-perceivable frequency components in the visible light by positioning (1) each first pulse such that a center of gravity of the first pulse is at a center of the respective first period, and (2) each second pulse such that a center of gravity of the second pulse is at a center of the respective second period, wherein the sequence of signal parts includes a first signal part that is followed by a second signal part, and a time period between the first center of gravity of a last one of the first pulses in the first signal part and the second center of gravity of a first one of the second pulses in the second signal part equals half of the sum of the first period and the second period.

* * * * *